United States Patent [19]

Mikami et al.

[11] 4,251,825
[45] Feb. 17, 1981

[54] NON-IMPACT PRINTER USING A MODULATED LIGHT BEAM

[75] Inventors: Tomohisa Mikami, Kawasaki; Tadashi Matsuda, Yokohama; Fumitaka Abe, Inagi, all of Japan

[73] Assignee: Fujitsu Limited, Tokyo, Japan

[21] Appl. No.: 971,659

[22] Filed: Dec. 21, 1978

[30] Foreign Application Priority Data

Dec. 30, 1977 [JP] Japan .................................. 52-158422

[51] Int. Cl.³ .............................................. G06F 3/14
[52] U.S. Cl. ...................................... 346/160; 178/15; 346/107 A; 346/109; 358/199; 358/206
[58] Field of Search ............. 178/15; 346/107 A, 109, 346/160; 358/199, 206, 148

[56] References Cited

U.S. PATENT DOCUMENTS

| 3,673,602 | 6/1972 | Stefansson et al. | 346/109 |
| 4,024,341 | 5/1977 | Takahashi | 178/15 |
| 4,081,604 | 3/1978 | Kanaiwa | 178/15 |
| 4,133,600 | 1/1979 | Russell et al. | 178/15 |

Primary Examiner—Marshall M. Curtis
Attorney, Agent, or Firm—Staas & Halsey

[57] ABSTRACT

A non-impact printer comprising: a light source; a light modulator; a light modulation controller including a print timing control pulse generator; a light beam reflector made of a polygonal mirror; and a photoconductor drum upon which a modulated light beam scans an area used for scanning, wherein the print timing control pulse generator further includes a compensating means basically comprised of a means for measuring the respective scanning times required for scanning the respective lines to be scanned on the area used for scanning and a means for adjusting the periods of the print timing control pulses in accordance with each scanning time, thereby the same number of print timing control pulses can always be produced for every line to be scanned on the area used for scanning.

21 Claims, 14 Drawing Figures

NON-IMPACT PRINTER USING A MODULATED LIGHT BEAM

BACKGROUND OF THE INVENTION

1. Field of the Invention

The present invention relates to a non-impact printer, and more particularly relates to a non-impact printer using a modulated light beam.

2. Description of the Prior Art

Generally, the non-impact printer using a modulated light beam basically comprises: a light source; a light modulator which receives a light beam from the light source and which produces a modulated light beam in accordance with both a character signal provided from a character generator and print timing control pulses; a light modulation controller which is comprised of a print timing control pulse generator and a character generator which generates a character signal in synchronization with print timing control pulses; and a light beam reflector made of a rotating polygonal mirror which alternately reflects the modulated light beam for scanning an area of a rotating photoconductor drum. A printing sheet is coupled with the photoconductor drum by means of a transfer station. An original character pattern is reproduced on the printing sheet by utilizing a well-known electrophotographic process.

When reproducing an original character pattern on a printing sheet, it is desired that a high print quality be obtained. However, it is usually not easy to obtain such high print quality by using the above-mentioned non-impact printer, because inaccuracy of the print timing control pulse. In the prior art, for example, a glass bar is located in front of the photoconductor drum, such as that shown in FIG. 2 on page 184 of the article entitled "Optical Character Generation for a High Speed Non-impact Printer" from The Journal of Photographic Science, Vol. 25, 1977, by W. MEYE. The glass bar is useful for producing improved print timing control pulses, in order to obtain a high print quality. Although the glass bar is useful for producing improved print timing control pulses, it is, however, more preferable to produce print timing control pulses without using a physical object such as a glass bar in the printer system. That is, it would be most preferable to produce such print timing control pulses by using only electronically controlled means.

SUMMARY OF THE INVENTION

Therefore, it is an object of the present invention to provide a non-impact printer using a modulated light beam, in which the print timing control pulse generator can produce the improved print timing control pulses in order to obtain a high print quality, by using only a simple electronically controlled means.

BRIEF DESCRIPTION OF THE DRAWINGS

The present invention will be more apparent from the ensuing description with reference to the accompanying drawings wherein.

DESCRIPTION OF THE PREFERRED EMBODIMENT

Figure 1:
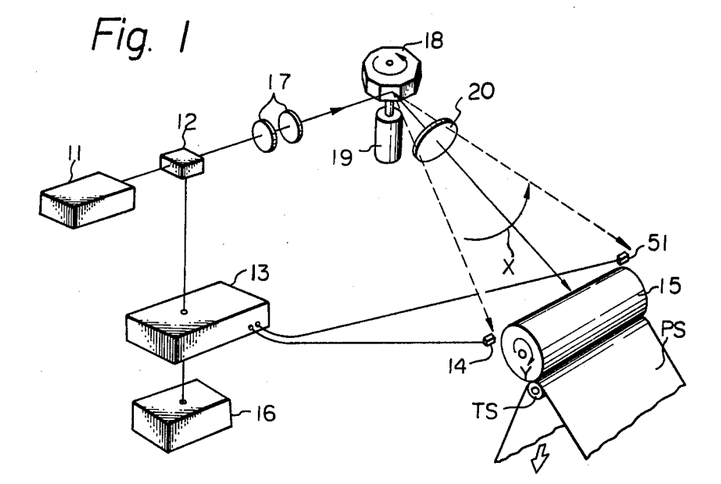
FIG. 1 is a schematically illustrated general view of a conventional non-impact printer system.

In FIG. 1, the reference numeral 11 represents a light source such as a laser diode. The reference numeral 12 represents a light modulator. The light beam modulator 12 receives a light beam supplied from the light source 11 and produces a modulated light beam in accordance with both a character signal and print timing control pulses which are all provided from a light modulation controller 13. The light modulation controller 13 is comprised of a print timing control pulse generator (not shown) contained therein. The print timing control pulse generator is operated by a print start pulse provided from a first photodetector 14 which is fixedly located close to one side of an area to be scanned on a photoconductor drum 15. The character signal is supplied from a character generator 16. The modulated light beam from the modulator 12 passes through a first lens system 17 which focuses the modulated light beam to the desired diameter on the photoconductor drum 15. The modulated light beam passed through the first lens system 17 is projected on a rotating polygonal mirror 18 which is rotated by an electric motor 19. The modulated light beam reflected by the mirror 18, sequentially scans the area to be scanned on the photoconductor drum 15 in alternating directions shown by the arrow X through a second lens system 20. The function of the second lens system 20 is to form dotted images on the drum 15. The drum 15 rotates in a direction shown by the arrow Y. A printing sheet PS is coupled with the photoconductor drum 15 by means of a transfer station TS. The members which are necessary for carrying out the conventional electrophotographic process, such as a corotoron, a developer, and a cleaner brush are located around the drum 15, but such members are not shown in FIG. 1.

Figure 2A:
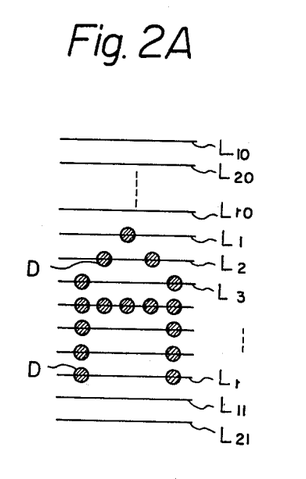
FIG. 2A shows an example of a normal dotted pattern.

When the character generator 16 generates a character signal indicating, for example, a character "A", the character "A" must be reproduced on the area to be scanned on the drum 15 with a normal dotted pattern such as that shown in FIG. 2A. in FIG. 2A, the reference symbols $L_1$, $L_2$, $L_3$ ... respectively represent the succeeding scanning lines. The reference symbols D represent respective dots reproduced by the modulated light beam projected through the lens system 20. However, generally, it is not easy to reproduce the character "A" and other characters with a normal dotted pattern as that shown in FIG. 2A. Thus, an abnormal dotted pattern such as that shown in FIG. 2B occurs very frequently during the conventional process, thus producing a low print quality.

Figure 2B:
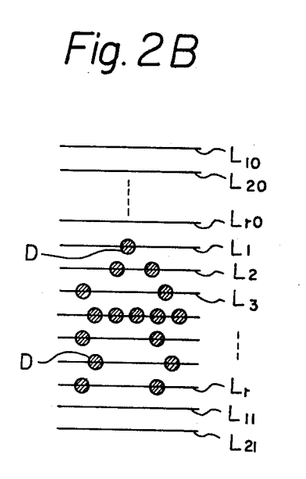
FIG. 2B shows an example of an abnormal dotted pattern.
Figure 3:
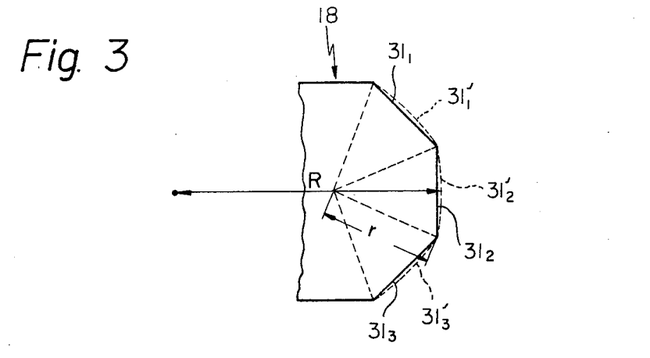
FIG. 3 is a partial plan view of a polygonal mirror 18 shown in FIG. 1.
Figure 4A:
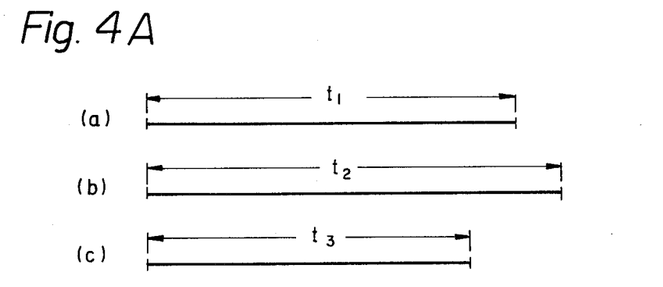
FIG. 4A is a graph used for explaining a principle of the present invention.

The reason why it is not easy to reproduce characters with a high print quality resides in the following fact. Generally, it is very difficult to manufacture each mirror face of the polygonal mirror 18 (see FIG. 1) with a high degree of accuracy. Accordingly, all the mirror faces do not have the same reflection characteristics but very different ones. In FIG. 3, which is a partial plan view of the polygonal mirror 18 (see FIG. 1), each of the mirror faces $31_1$, $31_2$, $31_3$... has respectively different reflection characteristics. Furthermore, the surface configuration of each of the mirror faces is changed due to a centrifugal force applied to each mirror face when the polygonal mirror 18 is rotating, during a printing operation, at a very high speed of, for example, several ten thousands of rotations per minute. In FIG. 3, the dotted lines $31_1'$, $31_2'$, $31_3'$... represent the actual surface configurations as changed by the centrifugal force. The symbol r indicates the radius of the mirror 18, and the symbol R indicates the radius of each of the mirror faces. The radius R is caused to be elongated by the centrifugal force, and is different for each mirror face. Consequently, it is impossible to obtain reflection characteristics which are identical for every mirror face. As a result, an abnormal dotted pattern such as that shown in FIG. 2B is inevitably reproduced unless an appropriate compensating means is introduced into the non-impact printer system, especially into the print timing control pulse generator. Such appropriate compensating means is provided according to the present invention, as will be apparent from the following explanation. When the modulated light beam is reflected by the mirror face $31_1$ (see FIG. 3), a corresponding line to be scanned $L_1$ (see FIGS. 2A and 2B) is produced. A scanning time of, for example, $t_1$, is required for the line $L_1$ to scan the entire area to be scanned on the photoconductor drum, as is schematically shown in FIG. 4A(a). Similarly, when the modulated light beam is reflected by the mirror faces $31_2'$, $31_3'$..., corresponding lines to be scanned, $L_2$, $L_3$, ... with scanning times of, for example, $t_2$, $t_3$, ... respectively, are sequencially produced. The scanning times of $t_2$ and $t_3$ required for the corresponding scanning lines to scan the area to be scanned on the drum", are schematically shown in rows (b) and (c) of FIG. 4A, respectively. Then, $t_1/\tau$ number of print timing control clock pulses, that is, $t_1/\tau$ number of dots represented by D in FIGS. 2A and 2B, is produced during one scanning by the line $L_1$, where $\tau$ represents the constant period of each print timing control pulse. Similarly, $t_2/\tau$ and $t_3/\tau$ numbers of print timing control pulses, that is, $t_2/\tau$ and $t_3/\tau$ numbers of dots represented by D in FIGS. 2A and 2B, are produced during respective scannings by the lines to be scanned, $L_2$ and $L_3$. It is important to note that, in the present invention, the same number of dots must be reproduced during respective scannings by the lines to be scanned, $L_1$, $L_2$, $L_3$... $L_r$, to be scanned, when there are r number of mirror faces, in order to obtain normal dotted patters such as that shown in FIG. 2A. Suppose that the same predetermined and constant K number of dots, (for example, K=4,000) is reproduced during respective scannings by the lines to be scanned, $L_1'$, $L_2$ ... $L_r$, then the above-mentioned numbers $t_1/\tau$, $t_2/\tau$, $t_3/\tau$ ... can be made to be equal to each other, regardless of the variation of the respective scanning times $t_1$, $t_2$, $t_3$ ..., by utilizing the compensating means of the present invention. Details of this compensating means will be disclosed hereinafter.

Figure 4B:
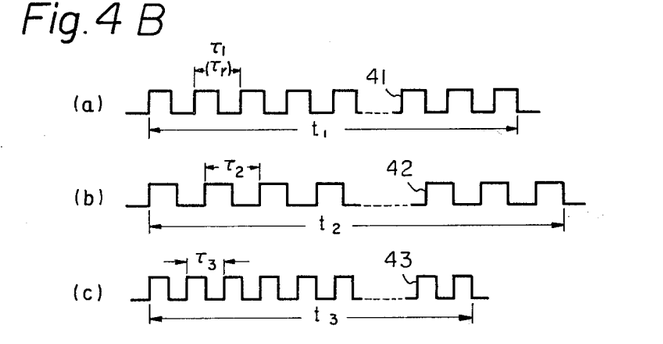
FIG. 4B shows the waveforms of print timing control pulses, according to the present invention.

This compensating means makes all the numbers $t_1/\tau$, $t_2/\tau$ ... equal to the number K by adjusting the period $\tau$ of the print timing clock pulses in order to reproduce the same number of dots, that is K, in each of the lines to be scanned, $L_1$, $L_2$, $L_3$ .... Then, the time periods $\tau_1$, $\tau_2$, $\tau_3$... are adjusted to be $t_1/K$, $t_2/K$, $t_3/K$ ..., respectively. These periods $\tau_1$, $\tau_2$ and $\tau_3$ are respectively shown in rows (a), (b) and (c) of FIG. 4B, wherein the reference numerals 41, 42 and 43 represent respective print timing control pulses. It should be noted that each of the print timing control pulses 41, 42 and 43 is composed of the same number of pulses, that is, K pulses.

Figure 5:
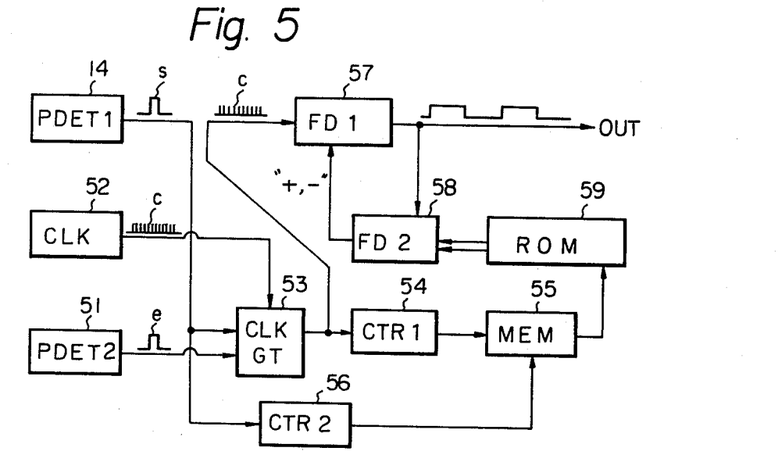
FIG. 5 illustrates a block diagram of a first embodiment of a compensating means according to the present invention.

A first embodiment of the above-described compensating means is shown in FIG. 5. In FIG. 5, a second photodetector 51 is newly employed in the non-impact printer system. As seen in FIG. 1, the first photodetector 14 is fixedly located close to one side of the area to be scanned on the drum 15. Accordingly, the newly employed second photodetector 51 is fixedly located close to the other side of the area to be scanned on the drum 15. The second photodetector 51 sends a print end pulse to the light modulation controller 13, while, as previously mentioned, the first photodetector 14 sends a print start pulse to the controller 13. The photodetectors 51 and 14 respectively send end and start pulses each time a light beam is projected onto the photodetectors. The pair of the first and second photodetectors 14 and 51 is useful for detecting the lengths of the above-mentioned scanning times such as $t_1$, $t_2$, $t_3$.... As shown in FIG. 5, a clock generator (CLK) 52 made of a conventional crystal oscillator is used to produce high-frequency clock pulses. The high-frequency clock pulses are divided into relatively low frequency pulses which function as the print timing control pulses. Generally, it is very difficult to obtain a print timing control pulse generator which can immediately generate accurate print timing control pulses after the occurrence of the print start pulse. Consequently, a time lag T between the print start pulse and the print timing control pulses becomes very large. However, if the print timing control pulses are produced by dividing the high-frequency clock pulses by, for example, a positive integer M, the time lag can be reduced to T/M. In FIG. 5, the high-frequency clock pulse "c" produced from the clock generator 52 are applied to a first counter (CTR 1) 54 via a clock gate (CLK GT) 53. When the light beam is projected to the first photodetector 14, the photodetector 14 sends a print start pulse "s". Then, the print start pulse "s" causes the clock gate 53 to be in an open state. Thereafter, the clock pulses "c" pass through the clock gate 53 and are applied to the counter 54. Next, the counter 54 starts counting the number of sequentially received clock pulses "c". The second photodetector 51 provides the print end pulse "e" only after the first light beam reflected by the mirror face $31_1'$ has finished scanning the corresponding line to be scanned $L_1$, (see FIGS. 2A and 2B) and simultaneously after the first light beam is projected to the second photodetector 51. As a result, the open state of the clock gate 53 is changed to a close state, and the clock pulses "c" are therefore not applied to the counter 54. Simultaneously, the counter 54 stops counting the number of clock pulses "c". Therefore, it should be noted that the count number of the counter 54 is proportional to the above-mentioned scanning time $t_1$. Then, the scanning time value $t_1$ is stored at a first address $A_1$ in a memory (MEM) 55. The first address $A_1$ is specified by a second counter (CTR 2) 56 by the following process. The counter 56 receives the print start pulses "s" and also counts the number of the sequentially received print start pulses "s". Accordingly, when the count number of the counter 56 is equal to 1, the counter 56 specifies the first address $A_1$ which corresponds to the first mirror face $31_1'$. When the count number of the counter 56 is equal to, for example, 3, the counter 56 specifies a third address $A_3$ which corresponds to the third mirror face $31_3'$ (see FIG. 3). In this case, the count number of the counter 54 is equal to the above-mentioned scanning time $t_3$. If the polygonal mirror has $N_r$ number of mirror faces, the counter 56 may be comprised of a conventional $N_r$ stage counter, for example, a hexadecimal counter when $N_r$ equals 16. When the count number is equal to $N_r$, and the counter 56 receives the next print start pulse "s", the count number of the counter 56 is reset to 1. Thus, the counter 56 produces the first through the $N_r$th addresses in synchronization with the rotation of the polygonal mirror. The scanning times $t_1$, $t_2$, $t_3$ . . . must be previously stored in the memory 55 before printing operation for reproducing a desired character can be started. In other words, referring to FIGS. 2A and 2B, the time $t_1$ required for scanning the line to be scanned, $L_1$, was already measured during the preceding scanning of a first line to be scanned, $L_{10}$. Accordingly, value of scanning time $t_1$ measured during the scanning of the first line to be scanned, $L_{10}$, is utilized for adjusting the time period $\tau_1$ of the print timing control pulses used for scanning the next line to be scanned, $L_1$. Similarly, the scanning time $t_2$ which was measured during the preceding scanning of a second line to be scanned, $L_{20}$, is utilized for adjusting the period $\tau_2$ of the print timing control pulses used for scanning $L_2$.

Figure 6:
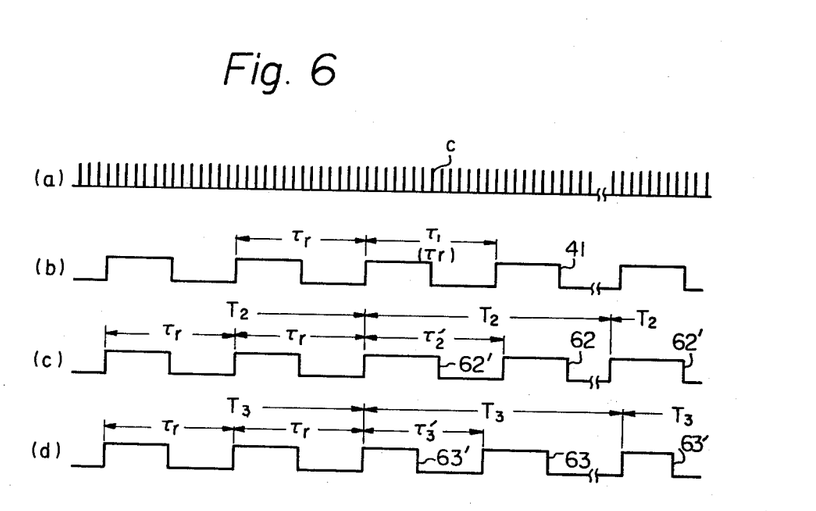
FIG. 6 shows waveforms of clock pulses and three kinds of print timing control pulses generated in the first embodiment of the present invention.

The print timing control pulses OUT shown in FIG. 5 are obtained, as previously mentioned, by dividing the high-frequency clock pulses "c". The dividing of the clock pulses "c" is achieved by means of a first frequency divider (FD 1) 57, which is a variable frequency divider, to produce the print timing control pulses OUT. The principle of the present invention, resides in the aforementioned feature that the time periods $\tau_1$, $\tau_2$, $\tau_3$ . . . of the print timing control pulses OUT must be adjusted in accordance with the scanning times $t_1$, $t_2$, $t_3$ . . . , respectively. That is, the periods $\tau_1$, $\tau_2$, $\tau_3$ . . . should be equal to $t_1/K$, $t_2/K$, $t_3/K$ . . . , respectively. The adjustments of the periods $\tau_1$, $\tau_2$, $\tau_3$ . . . are carried out by means of a second frequency divider (FD 2) 58 and also by means of a read-only memory (ROM) 59. The memory 59 stores a number of data bits with respect to respective scanning times. The stored data includes both a first instruction for determining whether the time period should be lengthened or shortened and a second instruction for determining the time interval within which adjustments of the time periods must be carried out. In the case that the scanning time $t_1$ (see FIG. 4A) is equal to a predetermined reference scanning time $t_r$, then the first and second instructions are not necessary. However, in the case where the scanning time $t_2$ (see FIG. 4A) is longer than the reference scanning time $t_r$, the first instruction is then required to specify that the period $\tau_2$ (see FIG. 4B) should be lengthened as compared to a predetermined reference period $\tau_r$ which is equal to the period $\tau_1$ (see FIG. 4B). Contrary to this, in the case where the scanning time $t_3$ (see FIG. 4A) is shorter than the reference scanning time $t_r$, the first instruction is then required to specify that the period $\tau_3$ (see FIG. 4B) should be shortened as compared to the reference period $\tau_r$. In this case, the second instruction is required to specify the time interval within which sequential adjustments of time periods must be carried out. It should be noted that in FIG. 4B a large number of the print timing control pulses 42 exhibits the reference period of $\tau_r$ and that a minor part thereof exhibits a relatively long period which occure periodically in synchronization with the above-mentioned time interval. Thus, the average period of each of the control pulses 42 is determined to be $\tau_2$. Similarly, a large number of the print timing control pulses 43 (see FIG. 4B) exhibits the reference period $\tau_r$ and a small number part of the pulses 43 exhibits a relatively short period which occurs periodically in synchronization with the above-mentioned time interval. Thus, the average period of each of the control pulses 43 is determined to be $\tau_3$. The above-mentioned relatively long or short period must occur periodically with a constant time interval along the corresponding line to be scanned so that dot position errors produced due to variation of the scanning time during each scanning are distributed uniformly within adjacent lines to be scanned. Thus the second instruction provides the above-mentioned constant time interval which is necessary for adjusting the above-mentioned long or short period. Specifically, if the frequency divider 57 divides the clock pulses "c" by a dividing ratio of 8, and if the total number of dot position errors becomes equal to a value of one dot d, adjustments of the periods are carried out eight times periodically along the line to be scanned. During each of the eight times, the period is lengthened or shortened by using a value which is proportional to d/8. In FIG. 6, a waveform of the clock pulse "c" is shown in row (a), and waveforms of the print timing control pulses 41, 62 and 63 are respectively shown in rows (b), (c) and (d). The control pulses 62 and 63 respectively correspond to the control pulses 42 and 43 shown in FIG. 4B. Regarding the control pulses 62, adjustments of the periods are carried out with respect only to the pulses 62' using time intervals $T_2$. Each of the pulses 62' has a relatively long period of $\tau_2'$. Each of the remaining pulses has a reference period of $\tau_r$. Similarly, with regard to the control pulses 63, adjustments of the periods are carried out with respect only to the pulses 63' using time intervals $T_3$. Thus, the first instruction determines whether the period should be lengthened or shortened and the second instruction determines whether the value of the time intervals should be $T_2$ or $T_3$. The optional values of such time intervals are precalculated by means of a computer with respect to scanning times of various length, and then stored in the memory 59. In FIG. 5, the memory 55 provides instruction which specifies scanning times such as $t_1$, $t_2$, $t_3$ . . . . Then, the memory 59 provides the optional first instruction and second instruction stored in an address specified by the number of respective scanning times. The second frequency divider 58 receives the second instruction from the memory 59 in the form of the number of print timing clock pulses, which number corresponds to a time interval such as $T_2$ or $T_3$ (see FIG. 6). Each time when the divider 58 finishes counting the number of control pulses produced from the divider 57, which number is equal to the optimal number specified by the second instruction, then the divider 58 changes the dividing ratio of the divider 57 by way of the line indicated by the symbols "+,−" according to the first instruction. Specifically, for example, when the modulated light beam reflected by the mirror face $31_2'$ (see FIG. 3) starts scanning the line to be scanned, $L_2$, (see FIGS. 2A and 2B), the counter 56 specifies the address $A_2$ in the memory 55. Then the memory 55 provides the information for specifying the scanning time $t_2$ stored in the specified address $A_2$. Accordingly, the value corresponding to the scanning time $t_2$ is used for specifying a corresponding address of the memory 59. Thereafter, the memory 59 produces the first instruction which indicates that the period $\tau_2'$ (see FIG. 6) should be longer than the reference period of $\tau_r$ (see FIG. 6). The memory 59 also produces the second instruction which indicates that the adjusted control pulses 62' (see FIG. 6) should be produced at every optimal time interval $T_2$.

Figure 7:
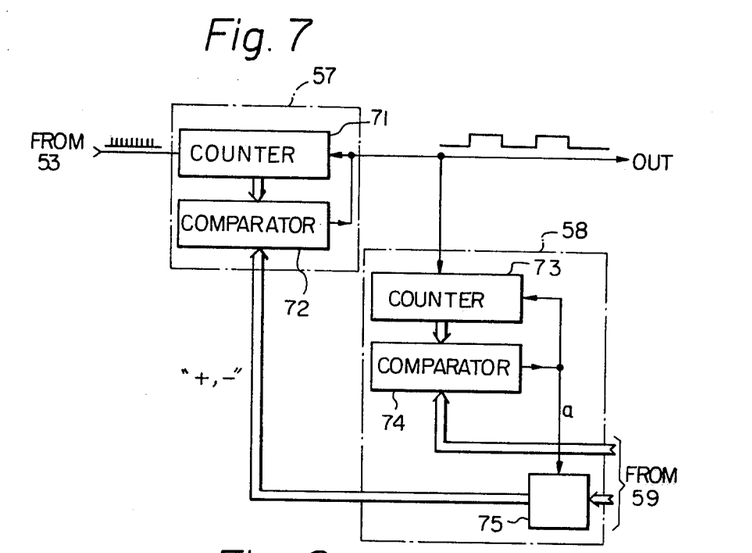
FIG. 7 illustrates a block diagram of a detailed example of a first frequency divider 57 and a second frequency divider 58 shown in FIG. 5.

The first frequency divider 57 and second frequency divider 58, both of which are variable frequency dividers, can be constructed by using an arrangement such as that shown in FIG. 7. The first frequency divider 57 is comprised of a conventional counter 71 and a conventional comparator 72. The second frequency divider 58 is also comprised of a conventional counter 73 and a conventional comparator 74. In the first frequency divider 57, the counter 71 receives and counts the clock pulses supplied from the clock gate 53 (see FIG. 5). The comparator 72 receives both the output of the counter 71 and the output of a gate 75, and produces the print timing control pulses "OUT". The comparator 72 usually maintains the number, for example 8, which is specified by the output of the gate 75. Therefore, the comparator 72 produces the control pulses "OUT" every time the count number in the counter 71 reaches 8. Simultaneously, the last control pulse "OUT" resets the counted number in the counter 71 to zero. In this case, the dividing ratio of the divider 57 is equal to 8, and the period of the control pulses "OUT" is equal to the reference period of $\tau_r$ (see FIG. 6). In the second frequency counter 58, the counter 73 receives the control pulses "OUT" and counts the number of control pulses "OUT". The comparator 74 receives both the output of the counter 73 and the output of the memory 59. The output from the memory 59 corresponds to the above-mentioned second instruction. When the modulated light beam starts scanning, for example, the line to be scanned, $L_2$, the number, for example, 200, specified as the second instruction, is applied to the comparator 74. Therefore, the comparator 74 produces an adjustment pulse "a" every time the count number in the counter 73 reaches 200, which number 200 corresponds to the value of the time interval $T_2$ (see FIG. 6). Simultaneously, the adjustment pulse "a" opens the gate 75 and resets the counter 73 to zero. Then the other output of the memory 59 is applied as the first instruction to the comparator 72 through the gate 75. In this case, the first instruction contains the number 9, and the dividing ratio of the divider 57 is thus changed from 8 to 9. As a result, each of the 200th, 400th, 800th . . . 4,000th control pulses, such as the control pulses 62' in FIG. 6, has a relatively long period of $\tau_2'$ (see FIG. 6). Consequently, the average period of each of the control pulses "OUT" becomes $\tau_2$ (see FIG. 4B). On the other hand, when the modulated light beam starts scanning, for example, the line to be scanned, $L_3$, the specified number, for example, 300, is applied as the second instruction to the comparator 74. Therefore, the comparator 74 produces an adjustment pulse "a" every time the count number in the counter 73 reaches 300, which number 300 corresponds to the value of the time interval $T_3$ (see FIG. 6). Simultaneously, the adjustment pulse "a" opens the gate 75 and resets the counter 73 to zero. In this case, the first instruction contains the number 7, and the dividing ratio of the divider 57, is thus changed from 8 to 7. As a result, each of the 300th, 600th, 900th . . . 3,900th control pulses, such as the control pulses 63' in FIG. 6, has a relatively short period of $\tau_3'$ (see FIG. 6). Consequently, the average period of each of the control pulses "OUT" becomes $\tau_3$ (see FIG. 4B).

Figure 8:
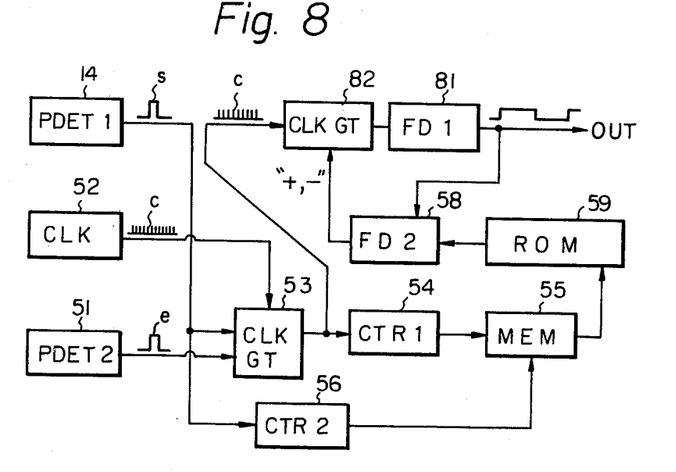
FIG. 8 illustrates a block diagram of a second embodiment of the compensating means according to the present invention.
Figure 9:
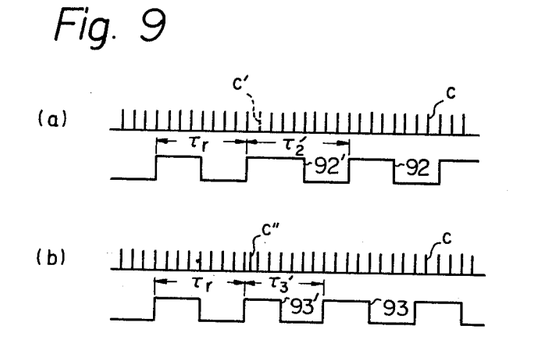
FIG. 9 shows waveforms of the clock pulses and the print timing control pulses generated in the second embodiment of the present invention.

A second embodiment of the above-mentioned compensating means is shown in FIG. 8. The members shown in FIG. 8 which are the same as the members shown in FIG. 5 are designated by the exact same numbers and symbols. Members 81 and 82 in FIG. 8 are newly employed in the second embodiment of the compensating means. The member 81 is a first frequency divider which is similar to the first frequency divider 57 shown in FIG. 5; however, the first frequency divider 81 is not a variable frequency divider but a constant frequency divider. The dividing ratio of the divider 81 is a fixed number, for example, 8. Although the dividing ratio of the divider 81 is not variable, the period of the print timing control pulses "OUT" can be varied. The principle of the second embodiment of the compensating means will be clarified by referring to FIG. 9 which shows the waveforms of the clock pulses and the print timing control pulses "OUT". In row (a) of FIG. 9, the control pulses 92 and 92' are substantially the same as the control pulses 62 and 62' shown in FIG. 6, respectively. In this case, since the clock pulses "c'" indicated by the dotted line are stopped from being supplied to the divider 81 (FIG. 8), each period of the control pulses 92' becomes $\tau_2'$, which period is longer than the reference period of $\tau r$. In row (b) of FIG. 9, the control pulses 93 and 93' are substantially the same in length as the control pulses 63 and 63' shown in FIG. 6, respectively. In this case, since additional clock pulses "c''" are further applied to the divider 81, each period of the control pulses 93' becomes $\tau_3'$, which period is shorter than the reference period of $\tau r$. It should noted that it takes a longer time for the divider 81 to count a series of eight constant control pulses which do not include the above-mentioned clock pulses "c'" than to count the normal constant control pulses "c". Contrary to this, it takes a shorter time for the divider 81 to count series of constant eight control pulses which include the above-mentioned additional clock pulses "c''" than to count normal constant control pulses "c". The deletion of the clock pulse "c'" and the addition of the clock pulse "c''" are respectively carried out by means of a clock gate 82 (FIG. 8) utilizing the time intervals $T_2$ and $T_3$, respectively.

Figure 10:
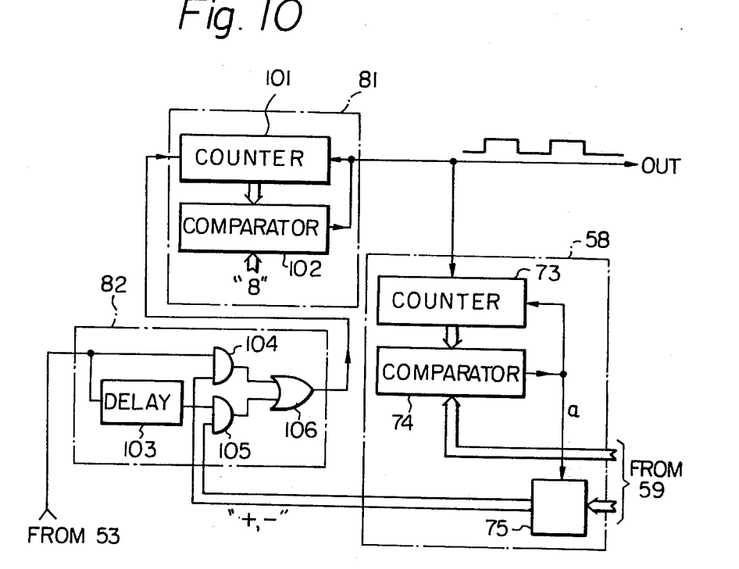
FIG. 10 illustrates a block diagram of a detailed example of a first frequency divider 81, and a clock gate 82 and the second frequency divider 58 shown in FIG. 8.

FIG. 10 illustrates a detailed arrangement including the first frequency divider 81, the clock gate 82 and the second frequency divider 58. The divider 81 is comprised of a conventional counter 101 and a conventional comparator 102. The counter 101 is the same as the counter 71 in FIG. 7, the comparator 102 maintains a constant number, for example, 8. Accordingly, the divider 81 produces the print timing control pulses "OUT" every time the counter 101 counts eight clock pulses supplied from the clock gate 82. The clock gate 82 is comprised of a delay circuit 103, AND-gates 104, 105, and an OR-gate 106. The delay time of the delay circuit 103 is selected to be a time corresponding to about a half period of the clock pulses "c". The clock pulses "c" and the delayed clock pulses "c'''" are respectively applied to respective first inputs of the AND-gates 104 and 105. The respective second inputs thereof receive an output from the gate 75. When output bits (1,0) are respectively applied to the respective first inputs of the AND-gates 104 and 105, original clock pulses "c" are applied to the divider 81. If output bits (0,0) are respectively applied to the respective first inputs of the AND-gates 104 and 105, then the OR gate 106 will not produce any clock pulses. Thus, deletion of the clock pulses "c'" (see FIG. 9) can be carried out. Contrary to this, if the output bits (0,1) are applied thereto, the clock pulse "c''''" (see FIG. 9) is produced from the AND-gate 105. Thus, addition of the clock pulse "c''''" can be carried out.

Figure 11:
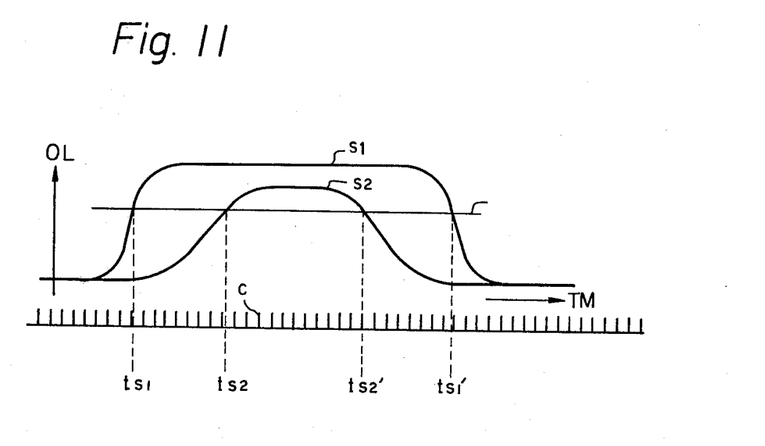
FIG. 11 is a graph showing the output levels of a photodetector 14 shown in FIGS. 1, 5 and 8.
Figure 12:
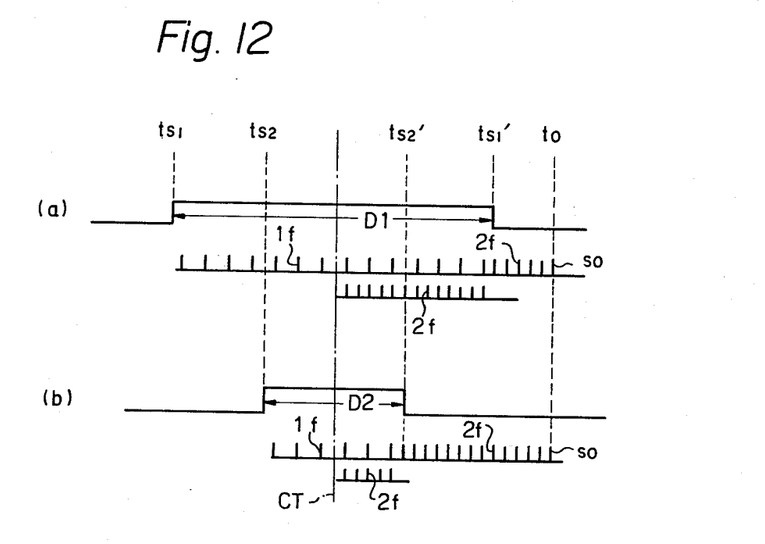
FIG. 12 shows the waveforms of the pulses used for creating a normalized print start pulse "s0", according to the present invention.

In both the first and second embodiments of the compensating means shown in FIGS. 5 and 8, it is very important for the counter 54 to measure the scanning times, such as $t_1$, $t_2$, $t_3$..., with a very high degree of accuracy. This is because, the adjustments of the periods of the print timing control pulses are carried out basically in accordance with each value corresponding to the scanning times. However, in practice, it is very difficult to measure the scanning times with a very high degree of accuracy, due to unevenness of the mirror faces $31_1'$, $31_2'$, $31_3'$... (see FIG. 3). Such unevenness will be clarified by examining the waveforms shown in FIG. 11. In FIG. 11, a curve s1 represents one example of a waveform of a print start pulse "s" produced from the photodetector 14 (see FIGS. 1, 5 and 8), and a curve s2 represents another example of a waveform of the start pulse "s". The ordinate of the graph in FIG. 11 indicates the output level (OL) of the pulse "s", and the abscissa thereof indicates the elapsed time (TM). The reference symbol "c" represents the clock pulses transmitted from the clock generator 52 (see FIGS. 5 and 8), and the reference symbol Vth represents a predetermined threshold voltage level. As seen from FIG. 11, the output levels from the photodetector 14 vary in accordance with the change in rotation of the mirror faces because these mirror faces have reflection characteristics which are different from each other. The occurrence of the start pulse "s" is defined by the time when the output level of the start pulse "s" exceeds the threshold voltage level Vth. Accordingly, the occurrences of the start pulses s1 and s2 are defined by the times ts1 and ts2, respectively. Any error occurring between the times ts1 and ts2 should be minimized in order to measure the scanning time with a very high degree of accuracy. The present invention further provides a technique for minimizing any error occurring between the times ts1 and ts2. This technique can be carried out by utilizing a first means which produces first constant clock pulses having frequency of "f" hz when the output level exceeds the threshold voltage level Vth, a second means which starts producing second constant clock pulses having a frequency of "2f" Hz after the output level falls below the threshold voltage level Vth and a third means which produces a normalized print start pulse when the third means counts the predetermined total number of the first and second constant clock pulses. Referring to row (a) of FIG. 12, regarding the curve s1 in FIG. 11, the first means produces the first constant clock pulses "1f" during a time period of D1. The second means starts producing the second constant clock pulses "2f" after the end of the time period of D1. The third means counts the predetermined total numbers of the clock pulses "1f" and "2f". In this case, the above-mentioned predetermined total number of both the first and second constant clock pulses, is, for example, twenty, in FIG. 12. When the third means finishes counting the twenty clock pulses, then the third means produces a normalized print start pulse "s0". Similarly, referring to row (b) of FIG. 12, with regard to the curve s2 in FIG. 11, the first means produces the first constant clock pulses "1f" during a time period designated as D2. The second means starts producing the second constant clock pulses "2f" after the end of the time period of D2. The third means counts the above-mentioned predetermined total number of both clock pulses "1f" and "2f", that is twenty. When the third means finishes counting the twenty clock pulses, then it produces normalized print start pulse "s0". It is important to notice that each of the normalized print start pulse "s0" is always created at the same time, i.e., at "$t_0$". The reason for this is because, regarding the curve s1, twenty clock pulses "2f" occur between the time "$t_0$" and the time labeled "CT"; while, regarding the curve s2, twenty clock pulses "2f" also occur between the time "$t_0$" and the time labeled "CT". The above-mentioned first, second and third means should also be incorporated into the photodetector 51 shown in FIGS. 1, 5 and 8.

In the first and second embodiments of the compensating means shown in FIGS. 5 and 8, respectively, the scanning time data to be stored in the memory 55, such as $t_1$, $t_2$, $t_3$..., are renewed every time the light beam scans the respective lines $L_1$, $L_2$, $L_3$... to be scanned. The renewal of the scanning time data is necessary if the electric motor 19 (see FIG. 1) is rotating at an unconstant speed with a long period variation, for example, a variation of 10 Hz. However, if the electric motor 19 is controlled to rotate at a constant speed, the above-mentioned renewal of the scanning time data in the memory 55 is not necessary. In this case, only fresh data corresponding to the scanning times obtained during the beginning of the operation are stored in the memory 55, and succeeding data corresponding to the scanning times may be cancelled by means of an appropriate gate (not shown). The appropriate gate may be located between the counter 54 and the memory 55, and is opened for transferring the output of the counter 54 to the memory 55 through this open gate, only during the beginning of the print operation.

As mentioned above, a non-impact printer with a high print quality can be realized only by adding a simple compensating means to a conventional print timing control pulse generator. The compensating means can compensate the differences in the reflection characteristics of the mirror faces of the polygonal mirror. Accordingly, an ordinary polygonal mirror, which does not have high and uniform reflection characteristics but which is very cheap in cost, can be used. The present invention is only described with reference to application to a non-impact printer; however, the present invention can also be utilized in a similar technical field of art, such as in an ion milling machine using a laser beam.

What is claimed is:

1. A compensating system for a non-impact printer comprising:
   a light source for generating a light beam;
   a light modulation controller comprising a print timing control pulse generator for generating print timing control pulses and a character generator for generating a character signal in synchronization with said print timing control pulses;
   a light modulator, operatively connected to said print timing control pulse generator and said character generator, for receiving said light beam from said light source and for producing a modulated light beam in dependence upon said character signal and said print timing control pulses;
   a rotating photoconductor drum having a scanning area;
   a light beam reflector, comprising a rotating polygonal mirror, having a plurality of mirror faces, for alternately reflecting said modulated light beam onto said scanning area on said rotating photoconductor drum, said modulated light beam traversing a path whose locus corresponds to a plurality of scanning lines on said scanning area;
   a compensating means operatively connected to said print timing control pulse generator, comprising
   a measuring means for measuring the respective scanning times required for traversing each of said scanning lines, and
   an adjusting means, operatively connected to said measuring means and said print timing control pulse generator, for adjusting the periods of said print timing control pulses produced during the traversing of each of said scanning lines in dependence upon said respective scanning times measured by said measuring means.

2. A compensating system as set forth in claim 1, further comprising a first photodetector located at a first side of said scanning area and a second photodetector located at a second side of said scanning area, said first and second photodetectors operatively connected to said measuring means for measuring said respective scanning times, said first photodetector producing a print start pulse when said light beam actuates said first photodetector and said second photodetector producing a print end pulse when said light beam actuates said second photodetector.

3. A compensating system as set forth in claim 2, wherein said adjusting means adjusts, at a predetermined constant time interval, said periods of said print timing control pulses, said predetermined constant time interval dependent upon said respective scanning times.

4. A compensating system as set forth in claim 3, wherein said adjusting means adjusts, at said predetermined constant time interval, the duration of said periods of said print timing control pulses, said duration of said periods dependent upon said respective measured scanning times.

5. A compensating system as set forth in claim 4, wherein said measuring means comprises:
   a clock generator for generating clock pulses;
   a clock gate, operatively connected to said clock generator and said first and second photodetectors, said clock gate providing a gated clock pulse output when said first photodetector produces said print start pulse and wherein said clock gate prevents said gated clock pulse output when said second photodetector produces said print end pulse;
   a first counter for counting the number of said gated clock pulses, the number of said gated clock pulses counted by said first counter corresponding to one of said respective scanning times.

6. A compensating system as set forth in claim 5, wherein said adjusting means comprises:
   a read-only memory, operatively connected to the output of said first counter, for storing data bits corresponding to said respective scanning times of various length scanning lines, wherein each of said data bits contains a predetermined constant time interval instruction and a predetermined period instruction, said read-only memory being accessed by an address signal corresponding to the count of said first counter.

7. A compensating system as set forth in claim 6, wherein said measuring means further comprises:
   a second counter, operatively connected to said first photodetector, for counting the number of said print end pulses;
   a memory, operatively connected to said first and second counters and said read-only memory, for sequentially storing the counts of said first counter corresponding to each of said respective scanning times, said counts stored by said memory at an address specified by said second counter;
   whereby each address specified by said second counter corresponds to a different one of said scanning lines produced by said mirror faces of said rotating polygonal mirror, and
   said memory produces said address signals for accessing said read-only memory.

8. A compensating system as set forth in claim 7, wherein said adjusting means further comprises:
   a first frequency divider, operatively connected to the output of said clock gate and to said read-only memory, for dividing said gated clock pulses and for producing said print timing control pulses;
   a second frequency divider, operatively connected between said first frequency divider and said read-only memory, for receiving said data bits from said read-only memory and for controlling said first frequency divider, at said predetermined constant time interval, to adjust said duration of said periods of said print timing control pulses.

9. A compensating system as set forth in claim 8, wherein said first frequency divider comprises a variable frequency divider having a dividing ratio, said dividing ratio dependent upon said predetermined period instruction.

10. A compensating system as set forth in claim 3, wherein each of said respective scanning times is measured by said measuring means, said measuring means comprising:
    a clock generator for producing clock pulses;
    a clock gate, operatively connected to said clock generator and said first and second photodetectors, said clock gate providing a gated clock pulse output when said first photodetector produces said print start pulse and wherein said clock gate prevents said gated clock pulse output when said second photodetector produces a print end pulse, and
    a first a counter for counting the number of said gated clock pulses, the number of gated clock pulses counted by said first counter corresponding to one of said respective scanning times.

11. A compensating system as set forth in claim 10, wherein said adjusting means comprises:
- a read-only memory, operatively connected to the output of said first counter, for storing data bits corresponding to said respective scanning times of various length scanning lines, wherein each of said data bits contains a predetermined constant time interval instruction and a predetermined period instruction, said read-only memory being accessed by an address signal corresponding to the count of said first counter.

12. A compensating system as set forth in claim 11, wherein said measuring means further comprises:
- a second counter, operatively connected to said first photodetector, for counting the number of said print end pulses;
- a memory, operatively connected to said first and second counters and said read-only memory, for sequentially storing the counts of said first counter corresponding to each of said respective scanning times, said counts stored by said memory at an address specified by said second counter;
- whereby each address specified by said second counter corresponds to a different one said scanning lines produced by said mirror faces of said rotating polygonal mirror, and
- said memory produces said address signal for accessing said read-only memory.

13. A compensating system as set forth in claim 12, wherein said adjusting means further comprises:
- a first frequency divider, operatively connected to the output of said clock gate and said read-only memory, for dividing said gated clock pulses and for producing said print timing control pulses;
- a second frequency divider, operatively connected between said first frequency divider and said read-only memory, for receiving said data from said read-only memory and for controlling said first frequency divider.

14. A compensating system as set forth in claim 13, wherein said first frequency divider comprises:
- a constant frequency divider;
- a clock gate adjustment means, operatively connected to said clock gate, said second frequency divider, and said constant frequency divider, for supplying said gated clock pulses to said constant frequency divider, and wherein said clock gate adjustment means adds additional clock pulses between said gated clock pulses or periodically deletes certain said gated clock pulses in dependence upon said predetermined constant time interval, said predetermined constant time interval being controlled by said second frequency divider.

15. A compensating system as set forth in claim 9 or 14, wherein said second frequency divider comprises:
- a third counter, operatively connected to the output of said first frequency divider, for counting the number of said print timing control pulses;
- a data gate operatively connected between said read-only memory and said first frequency divider;
- a comparator, operatively connected between said third counter and said read-only memory, for comparing the counts of said third counter with a number, corresponding to said predetermined constant time interval instruction, from said read-only memory and for producing an adjustment pulse every time said count number equals the number from said read-only memory, wherein said data gate provides the date bits corresponding to said predetermined period instruction to said first frequency divider from said read-only memory every time said adjustment pulse is produced.

16. A compensating system as set forth in claim 14, wherein said clock gated adjustment means comprises:
- an output OR gate, operatively connected to said constant frequency divider, for supplying adjusted clock pulses to said constant frequency divider;
- two AND gates operatively connected to the input of said output OR gate, and
- a delay circuit, operatively connected to one of said two AND gates, for delaying said gated clock pulses received from said clock gated clock pulses received from said clock gate, wherein the other of said two AND gates is operatively connected to said clock gate, and wherein each of said two AND gates is operatively connected to said memory.

17. A compensating system for a non-impact printer comprising:
- a light source for generating a light beam;
- a light modulation controller comprising a print timing control pulse generator for generating print timing control pulses; a character generator for generating a character signal in synchronization with said print timing control pulses;
- a light modulator, operatively connected to said light modulation controller and said character generator, for receiving a light beam from said light source and for producing a modulated light beam in dependence upon said character signal and said print timing control pulses;
- a rotating photoconductor drum having a scanning area;
- a light beam reflector, comprising a rotating polygonal mirror, having a plurality of mirror faces for alternately reflecting said modulated light beam onto said scanning area on said rotating photoconductor drum, said modulated light beam traversing a path whose locus corresponds to a plurality of scanning lines on said scanning area;
- a compensating means, operatively connected to said print timing control pulse generator, comprising a measuring means for measuring the respective scanning times required for traversing each of said scanning lines, and an adjusting means, operatively connected to said print timing control pulse generator and said measuring means, for adjusting the periods of said print timing control pulses produced during traversing of each of said scanning lines, wherein said adjusting means adjusts, at a predetermined constant time interval, said periods of said print timing control pulses, said predetermined constant time interval being dependent upon said respective scanning times.

18. A compensating system as set forth in claim 17, wherein said adjusting means adjusts, at said predetermined constant time interval, the duration of said periods of said print timing control pulses, said duration of said periods being predetermined in dependence upon said respective scanning times.

19. A compensating system as set forth in claim 18, wherein said adjusting means comprises:
- a read-only memory, operatively connected to said measuring means, for storing data bits corresponding to said respective scanning times of various length scanning lines, wherein each of said data bits contains a predetermined constant time interval instruction at a predetermined duration of period instruction, and wherein said read-only memory is accessed by an address signal corresponding to the measurement of said measuring means.

20. A compensating system as set forth in claim 2, wherein said first photodetector is operatively connected to:
- a first means for producing first constant clock pulses, having a frequency of "f" Hz, when the output level of said first photodetector exceeds a predetermined threshold voltage level;
- a second means for producing second constant clock pulses, having a frequency of "2f" Hz, after the output level of said first photodetector falls below said predetermined threshold voltage, and
- a third means, operatively connected between said first photodetector and said measuring means, for producing a normalized clock pulse when the sum of said first and second constant clock pulses equals a predetermined number, and wherein said normalized clock pulse is said print start pulse.

21. A compensating system as set forth in claim 2, wherein said second photodetector is operatively connected to;
- a first means for producing first constant clock pulses, having a frequency of "f" Hz, when the output level of said second photodetector exceeds a predetermined threshold voltage level;
- a second means for producing second constant clock pulses, having a frequency of "2f" Hz, after the output level of said second photodetector falls below said predetermined threshold voltage, and
- a third means operatively connected between said second photodetector and said measuring means, for producing a normalized clock pulse when the sum of said first and second constant clock pulses equals a predetermined number, and wherein said normalized clock pulse is said print end pulse.

* * * * *

UNITED STATES PATENT AND TRADEMARK OFFICE
CERTIFICATE OF CORRECTION

PATENT NO. : 4,251,825

DATED : February 17, 1981

INVENTOR(S) : TOMOHISA MIKAMI ET AL.

It is certified that error appears in the above—identified patent and that said Letters Patent is hereby corrected as shown below:

On the title page:

Item: [75] Inventors, "Inagi" should be --Tokyo--;
    Item: [73] Assignee, "Tokyo," should be --Kawasaki--.

In Figure 11, "Vth" should be inserted where indicated in red.

Col. 3, line 5, "in" should be --In--;
    line 55, "sequencially" should be --sequentially--.

Col. 4, line 5, "patters" should be --patterns--;
    line 8, "$L_1$'" should be --$L_1$--;
    line 59, "are" should be --is--.

Col. 6, lines 20, 21, 26 and 27, "exhibits" should be --exhibit--;
    line 21, "occure" should be --occurs--;
    line 27, delete "part";
    line 65, "length," should be --lengths,--.

Col. 7, line 57, "example," should be --example--.

Col. 8, line 8, "ple," should be --ple--;
    line 16, "57," should be --57--;
    lines 49, 59, and 61, ""c"'" should be --"c''"--;
    line 52, after "should" insert --be--;
    line 57, "count" should be --count a--;
    line 58, "constant eight" should be --eight constant--.

UNITED STATES PATENT AND TRADEMARK OFFICE
CERTIFICATE OF CORRECTION

PATENT NO. : 4,251,825
DATED : February 17, 1981
INVENTOR(S) : TOMOHISA MIKAMI ET AL.

It is certified that error appears in the above—identified patent and that said Letters Patent is hereby corrected as shown below:

- 2 -

Col. 9, lines 11, 23 and 25, ""c"'" should be --"c'"--;
line 38, "sl" should be --sl--;
line 64, "hz" should be --Hz--.

Col. 10, line 27, "pulse" should be --pulses--.

Col. 12, line 65, "a counter" should be --counter--.

Col. 13, line 24, after "one" insert --of--.

Col. 14, line 14, delete "clock gated clock pulses";
line 15, delete "received from said".

Signed and Sealed this

Thirteenth Day of December, 1994

Attest:

BRUCE LEHMAN

Attesting Officer        Commissioner of Patents and Trademarks